(12) United States Patent
Vaddagiri

(10) Patent No.: US 7,739,685 B2
(45) Date of Patent: Jun. 15, 2010

(54) DECOUPLING A CENTRAL PROCESSING UNIT FROM ITS TASKS

(75) Inventor: Srivatsa Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1562 days.

(21) Appl. No.: 11/031,785

(22) Filed: Jan. 6, 2005

(65) Prior Publication Data

US 2006/0150187 A1    Jul. 6, 2006

(51) Int. Cl.
G06F 9/46    (2006.01)

(52) U.S. Cl. .......................... 718/102; 718/104

(58) Field of Classification Search .............. 718/104, 718/102
See application file for complete search history.

(56) References Cited

U.S. PATENT DOCUMENTS

| | | | |
|---|---|---|---|
| 4,047,161 A * | 9/1977 | Davis | 718/108 |
| 4,914,570 A * | 4/1990 | Peacock | 718/106 |
| 5,278,976 A | 1/1994 | Wu | |
| 5,295,264 A | 3/1994 | Werres et al. | |
| 5,355,488 A | 10/1994 | Cox et al. | |
| 5,903,752 A | 5/1999 | Dingwall et al. | |
| 5,924,032 A | 7/1999 | Kyllonen et al. | |
| 6,260,068 B1 * | 7/2001 | Zalewski et al. | 709/226 |
| 6,298,448 B1 | 10/2001 | Shaffer et al. | |
| 6,370,657 B1 * | 4/2002 | Jansen et al. | 714/23 |
| 6,633,402 B1 | 10/2003 | Shima et al. | |
| 6,785,889 B1 * | 8/2004 | Williams | 718/104 |
| 2003/0023890 A1 | 1/2003 | Na et al. | |

* cited by examiner

*Primary Examiner*—Meng-Ai An
*Assistant Examiner*—Camquy Truong
(74) *Attorney, Agent, or Firm*—Schmeiser, Olsen & Watts; William H. Steinberg

(57) ABSTRACT

A method and system for decoupling a central processing unit (CPU) of a plurality of hot CPUs from its assigned tasks. The hot CPUs are managed by an operating system of a computer system. A special flag is set, denoting that the CPU is to be decoupled from its assigned tasks. A special task coupled to the CPU is given a suitable scheduling policy and priority, wherein the special task gets enough continuous execution time to finish its job before another task executes on the CPU. The special task examines the special flag and decouples the first CPU from its assigned tasks after determining that the special flag has been set, wherein the special task does not relinquish control of the CPU. The decoupling of tasks from the CPU leaves at least one remaining CPU and occurs while the at least one remaining CPU is hot.

54 Claims, 12 Drawing Sheets

DECOUPLING A CENTRAL PROCESSING UNIT FROM ITS TASKS

BACKGROUND OF THE INVENTION

1. Technical Field

The present invention relates to a method and system for decoupling a central processing unit from its assigned tasks.

2. Related Art

Decoupling a central processing unit from its assigned tasks is currently implemented inefficiently, resulting in performance degradation. Thus, there is a need for a method and system for decoupling a central processing unit from its assigned tasks in a more efficient manner than is currently accomplished in the related art.

SUMMARY OF THE INVENTION

The present invention provides a method for decoupling a first central processing unit (CPU) from its assigned tasks, said method comprising the steps of:

setting a special flag denoting that a first CPU is to be decoupled from its assigned tasks, said first CPU being comprised by a plurality of hot CPUs within a computer system, said hot CPUs being managed by an operating system of the computer system;

setting a suitable scheduling policy and priority for a first special task coupled to the first CPU, the suitable policy and priority so chosen that the first special task gets enough continuous execution time to finish its job, said continuous execution time being defined as the amount of time allotted to a task for execution on a CPU, before another task is made to execute on the CPU;

adding the first special task in a runqueue of the first CPU; and executing the first special task on the first CPU, said executing the first special task including examining the special flag and decoupling the first CPU from its assigned tasks after determining that the special flag has been set, said decoupling accomplished by having the first special task not relinquish control of the first CPU such that the first CPU is unable to execute any of its assigned tasks, said decoupling of tasks from the first CPU leaving at least one remaining CPU of the plurality of hot CPUs, said decoupling of tasks from the first CPU occurring while the at least one remaining CPU is hot.

The present invention provides a computer system for decoupling a central processing unit (CPU) from its assigned tasks, said computer system comprising:

a plurality of hot CPUs including a first CPU, said hot CPUs being managed by an operating system of the computer system;

means for setting a special flag denoting that the first CPU is to be decoupled from its assigned tasks;

means for setting a suitable scheduling policy and priority for a first special task coupled to the first CPU, the suitable policy and priority so chosen that the first special task gets enough continuous execution time to finish its job, said continuous execution time being defined as the amount of time allotted to a task for execution on a CPU, before another task is made to execute on the CPU;

means for adding the first special task in a runqueue of the first CPU; and means for executing the first special task on the first CPU to examine the special flag; and means for decoupling the first CPU from its assigned tasks following a determination by the first CPU that the special flag has been set, subject to the first special task not relinquishing control of the first CPU and the first CPU being unable to execute any of its assigned tasks, and further subject to the decoupling of tasks from the first CPU leaving at least one remaining CPU of the plurality of hot CPUs and occurring while the at least one remaining CPU is hot.

The present invention provides a computer program product, comprising a computer usable medium having a computer readable program code embodied therein, said computer readable program code comprising an algorithm adapted to implement a method for decoupling a first central processing unit (CPU) from its assigned tasks, said method comprising the steps of:

setting a special flag denoting that a first CPU is to be decoupled from its assigned tasks, said first CPU being comprised by a plurality of hot CPUs within a computer system, said hot CPUs being managed by an operating system of the computer system;

setting a suitable scheduling policy and priority for a first special task coupled to the first CPU, the suitable policy and priority so chosen that the first special task gets enough continuous execution time to finish its job, said continuous execution time being defined as the amount of time allotted to a task for execution on a CPU, before another task is made to execute on the CPU;

adding the first special task in a runqueue of the first CPU; and executing the first special task on the first CPU, said executing the first special task including examining the special flag and decoupling the first CPU from its assigned tasks after determining that the special flag has been set, said decoupling accomplished by having the first special task not relinquish control of the first CPU such that the first CPU is unable to execute any of its assigned tasks, said decoupling of tasks from the first CPU leaving at least one remaining CPU of the plurality of hot CPUs, said decoupling of tasks from the first CPU occurring while the at least one remaining CPU is hot.

The present invention provides a process for deploying computing infrastructure, comprising integrating computer-readable code into a computer system, wherein the code in combination with the computer system is capable of performing a method for decoupling a first central processing unit (CPU) from its assigned tasks, said method comprising the steps of:

setting a special flag denoting that a first CPU is to be decoupled from its assigned tasks, said first CPU being comprised by a plurality of hot CPUs within a computer system, said hot CPUs being managed by an operating system of the computer system;

setting a suitable scheduling policy and priority for a first special task coupled to the first CPU, the suitable policy and priority so chosen that the first special task gets enough continuous execution time to finish its job, said continuous execution time being defined as the amount of time allotted to a task for execution on a CPU, before another task is made to execute on the CPU;

adding the first special task in a runqueue of the first CPU; and executing the first special task on the first CPU, said executing the first special task including examining the special flag and decoupling the first CPU from its assigned tasks after determining that the special flag has been set, said decoupling accomplished by having the first special task not relinquish control of the first CPU such that the first CPU is unable to execute any of its assigned tasks, said decoupling of tasks from the first, CPU leaving at least one remaining CPU of the plurality of hot CPUs, said decoupling of tasks from the first CPU occurring while the at least one remaining CPU is hot.

The present invention advantageously provides a method and system for decoupling a central processing unit from its assigned tasks in a more efficient manner than is currently accomplished in the related art.

DETAILED DESCRIPTION OF THE INVENTION

A need may exist to decouple a central processing unit (CPU) from a computer system, or from a portion (e.g., a partition) of the computer system, for various reasons. As a first example, the CPU may no longer be needed because other CPUs are sufficient for handling the computing load of the computer system (see FIGS. 3-4 described infra). As a second example, the CPU may be defective and needs to be replaced by another CPU (see FIGS. 5-6 described infra). As a third example, the CPU is within a partition of the computer system and needs to be moved to another partition (see FIG. 7 described infra).

Each CPU has tasks assigned to the CPU. The word "task" is used herein to refer to a stream of executable code that can be scheduled for execution on some CPU of the computer system. Some systems refer to such tasks as either threads or processes. Decoupling the CPU from the computer system, or from a portion of the computer system, comprises decoupling the CPU from its tasks such that the CPU cannot execute its assigned tasks. Thus tasks that are assigned to the CPU may be decoupled from the CPU while still being assigned to the CPU if the CPU is unable to execute the tasks. The present invention discloses a method and system for decoupling the CPU from its assigned tasks without depowering (i.e., powering down) the remaining CPUs of the computer system; i.e., while the remaining CPUs are "hot" and running. A CPU is "hot" if the CPU is executing its assigned work, wherein said work could be either running tasks or processing interrupts and exceptions.

Figure 1:
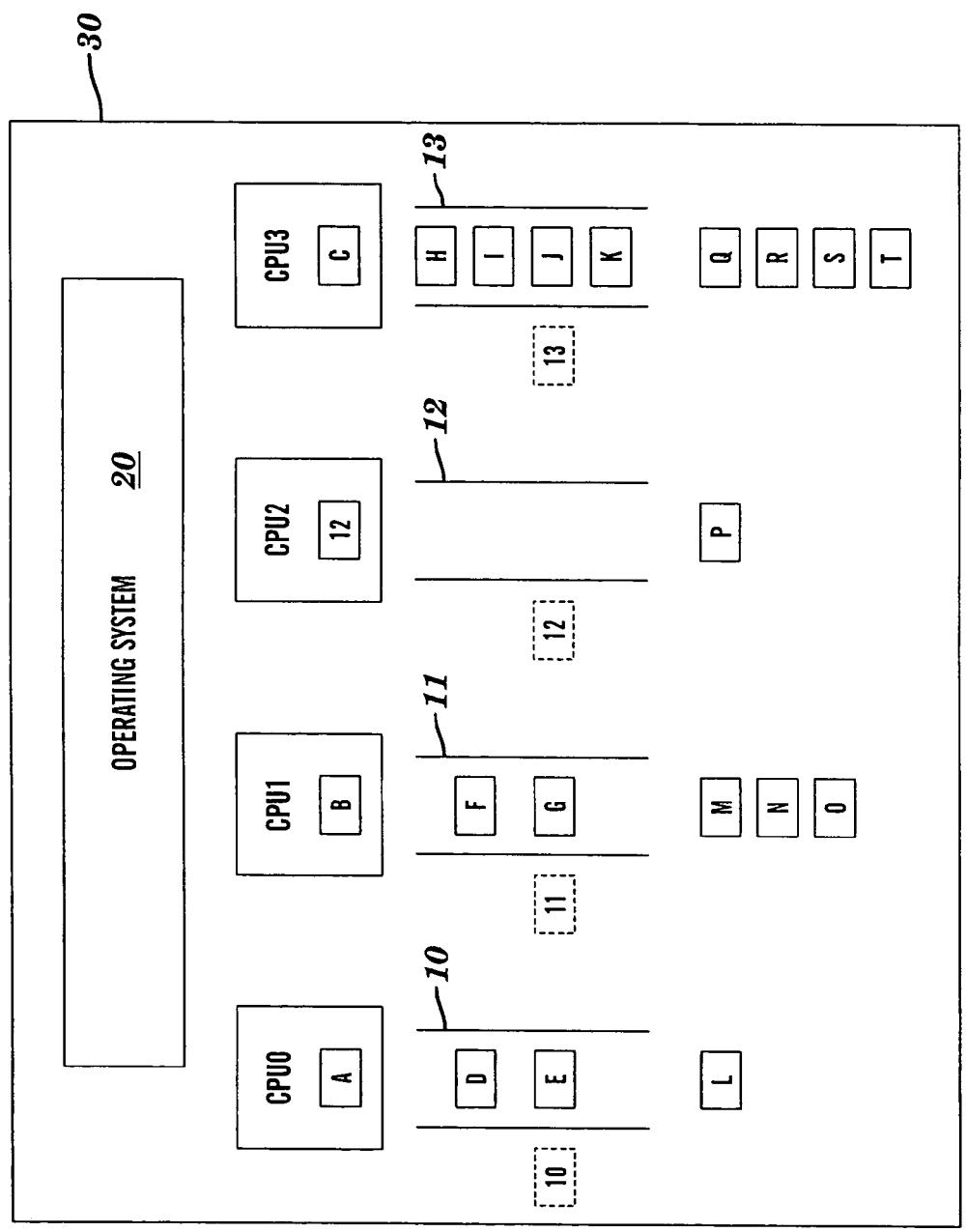
FIG. 1 depicts a computer system comprising an operating system and central processing units (CPUs) with their assigned tasks, in accordance with embodiments of the present invention.

FIG. 1 depicts a computer system 30 including an operating system 20 and central processing units (CPUs) with their assigned tasks, in accordance with embodiments of the present invention. Note that all the CPUs are managed by an operating system, which is understood to mean that each of the CPUs is being managed by the same operating system software. As an example, each CPU may be managed by an image of said same operating system software. This is characteristic of tightly coupled systems. Examples of such system configurations are Symmetric Multiprocessing (SMP) and Non-Uniform Memory Access (NUMA). The CPUs in FIG. 1 are denoted as CPU0, CPU1, CPU2, and CPU3 and have runqueues 10, 11, 12, and 13, respectively. FIG. 1 depicts tasks A-T and I0-I3. Tasks A, D-E and L are assigned to CPU0. Tasks B, F-G and M-O are assigned to CPU1. Task P is assigned to CPU2. Tasks C, H-K and Q-T are assigned to CPU3.

Figure 2:
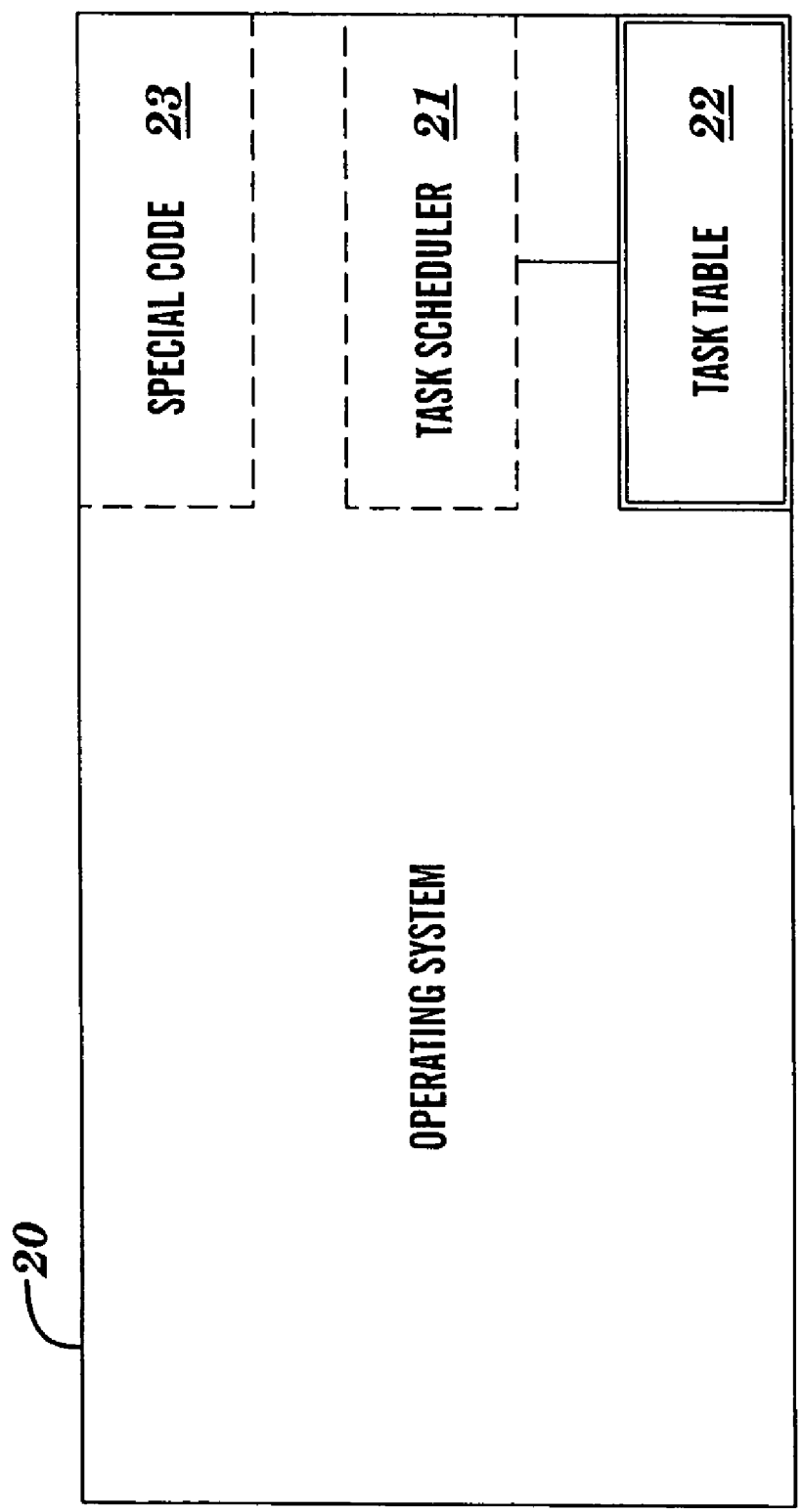
FIG. 2 depicts the operating system of FIG. 1, in accordance with embodiments of the present invention.

As shown in FIG. 2, the operating system 20 comprises a task scheduler 21 and a special code 23, in accordance with embodiments of the present invention. The task scheduler 21 schedules execution of the tasks on their respective CPUs. The tasks are listed in task table 22 which may be indexed by task ID. The task table 22 may include, inter alia, the status of each task (e.g., running, ready-to-run, or sleeping, as explained infra) and CPU affinity (i.e., CPU assignment) of each task. The special code 23 is executable code used to facilitate decoupling of a CPU from its assigned tasks as will be described infra in conjunction with FIGS. 10-13.

Associated with each task are two scheduling attributes of scheduling policy and scheduling priority.

Operating systems that are certified under the Portable Operating System Interface (POSIX®) standard typically support following scheduling policies:

SCHED_FIFO (represents first-in-first-out scheduling);

SCHED_RR (represents round-robin scheduling); and

SCHED_OTHER (represents typically the default scheduling policy).

Other operating systems, that are not POSIX® compliant, may support equivalent or different policies for tasks to be associated with.

Scheduling priority defines the relative importance of the task compared to other tasks. The task scheduler takes into account scheduling priorities before assigning tasks to a CPU. Tasks with higher scheduling priority are assigned first to the CPU compared to tasks with lower scheduling priority. Normally operating systems define a priority range for each scheduling policy.

Of particular interest to this invention is the "continuous execution time" allotted to a task. The "continuous execution time" is defined as the amount of time a task is allowed to execute on a CPU before some other task is made to execute on the same CPU. Normally, the operating system task scheduler allots time-slices to tasks such that the various tasks get to execute on a CPU on some turn-by-turn basis. The duration of each time-slice is implementation dependent and can be fixed or variable (depending on various factors at run-time). Typically time-slices are few hundred milliseconds. Each task, once assigned to a CPU, gets to run continuously on the CPU, until either its time-slice expires or it voluntarily yields the CPU or is preempted by a higher priority task. After this, the operating system scheduler assigns some other task to the CPU.

An exception to the time-slicing is a task that runs under SCHED_FIFO (or its equivalent) policy. Such a task is not subject to time-slices. In other words, a task running with SCHED_FIFO (or equivalent) policy and having some scheduling priority, continues to run on the CPU until it either voluntarily yields the CPU or is preempted by a higher priority task.

Note that during the "continuous execution time" allotted to a task, the task's execution can still be interrupted by events like device interrupts. Such events interrupt the task's execution for some brief interval before restoring the CPU back to the task.

Returning to FIG. 1, each task has a status reflective of the task's state for being run or executed on the CPU that the task is assigned to, namely a status of: running, ready-to-run, or sleeping. A task having the "running" status is being currently executed on the CPU (e.g., tasks A, B, and C are running on CPU0, CPU1, and CPU3, respectively). A task having the "ready-to-run" status is in the CPU's runqueue and is ready to be run on the CPU when the CPU is available in light of the task's scheduling priority versus the scheduling priority of the other tasks in the CPU's runqueue. For example, task C is currently running on CPU3 and tasks H, I, J, and K are stacked in the runqueue 13 of CPU3 in order of their scheduling priority. Thus, CPU3 is adapted to execute: task H after task C is executed, task I after task H is executed, task J after task I is executed, and task K after task J is executed. A task having the "sleeping" status is not in the runqueue, but will be awakened and made "ready-to-run" upon the occurrence of an event (e.g., upon completion of reading a particular data file). When a "sleeping" task is awakened and made "ready-to-run", the awakened task is placed in its CPU's runqueue. For example, when task Q is awakened, task Q will become ready-to-run and will be placed in the runqueue 13. Each CPU has a special task, called "idle" task, associated with the CPU. When there are no ready-to-run tasks in the runqueue, the task scheduler 21 (see FIG. 2) will schedule the "idle" task. Normally, the idle task is a lowest priority task and will neither be present in the runqueue nor in the task table.

As seen in FIG. 1, CPU0 is running task A, tasks D and E are in CPU0's runqueue 10 such that task D will run next followed by the running of task E, task L is sleeping, and task I0 is CPU0's idle task. CPU1 is running task B, tasks F and G are in CPU1's runqueue 11 such that task F will run next followed by the running of task G, tasks M-O are sleeping, and task I1 is CPU1's idle task. CPU2 is running its idle task I2, since no tasks are in CPU2's runqueue 12 and task P is sleeping. CPU3 is running task C, tasks H-K are in CPU3's runqueue 13 such that the tasks in the runqueue 13 will be subsequently executed in the sequential order of H, I, J, and K, tasks Q-T are sleeping, and task I3 is CPU3's idle task.

Figure 3:
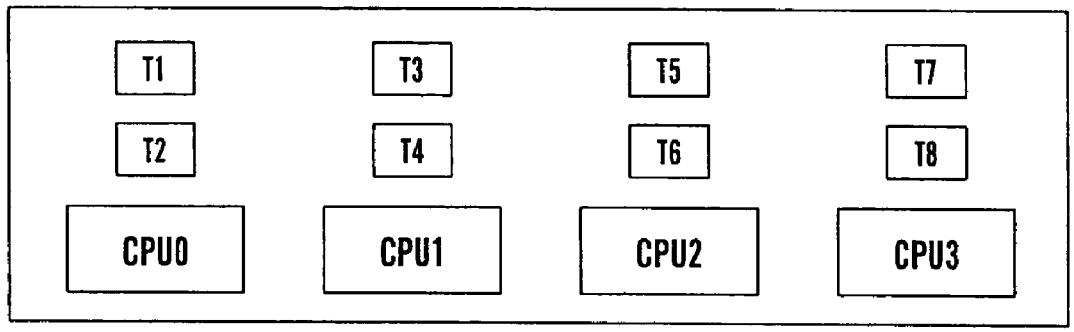
FIGS. 3-4 illustrate removal of a CPU from a computer system comprising multiple CPUs, in accordance with embodiments of the present invention.
Figure 4:
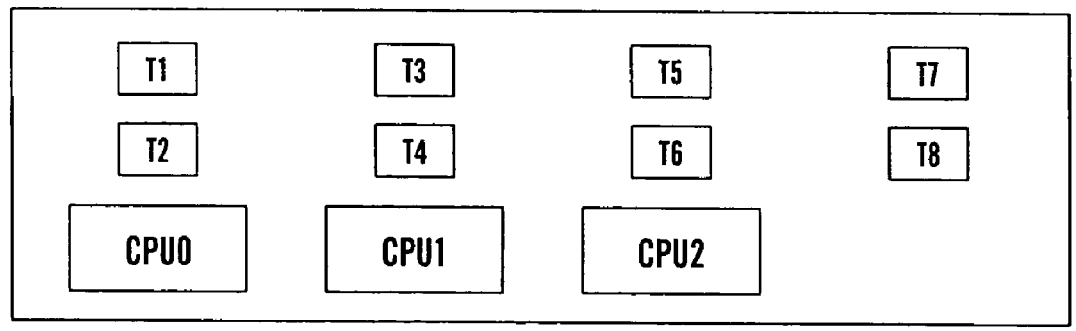

FIGS. 3-4 illustrate removal of a CPU from a computer system comprising multiple CPUs, in accordance with embodiments of the present invention. In FIG. 3, the multiple CPUs comprise CPU0, CPU1, CPU2, and CPU3 and CPU3 is to be removed (e.g., CPU3 may be defective). CPU0 has assigned tasks T1-T2, CPU1 has assigned tasks T3-T4, CPU2 has assigned tasks T5-T6, and CPU3 has assigned tasks T7-T8. The present invention discloses how to remove CPU3 while CPU0-CPU2 remain hot. Removing CPU3 may comprise powering down CPU3. FIG. 4 shows FIG. 3 after CPU3 has been removed. In FIG. 4, tasks T7-T8 have been decoupled from CPU3, and will subsequently be migrated to CPU0-CPU2 in accordance with a migration scheme.

Figure 5:
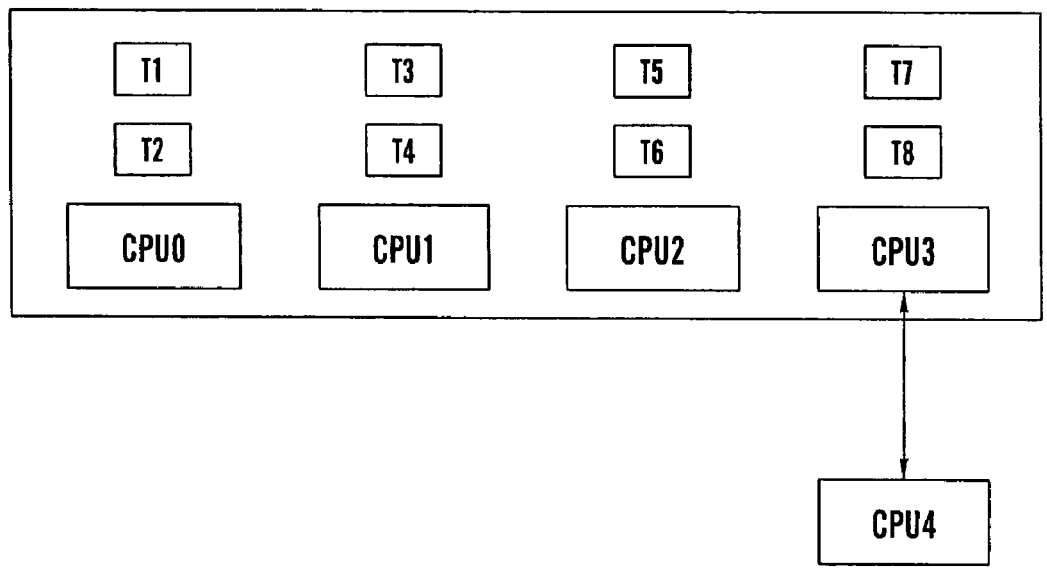
FIGS. 5-6 illustrate replacement of a CPU from a computer system comprising multiple CPUs, in accordance with embodiments of the present invention.
Figure 6:
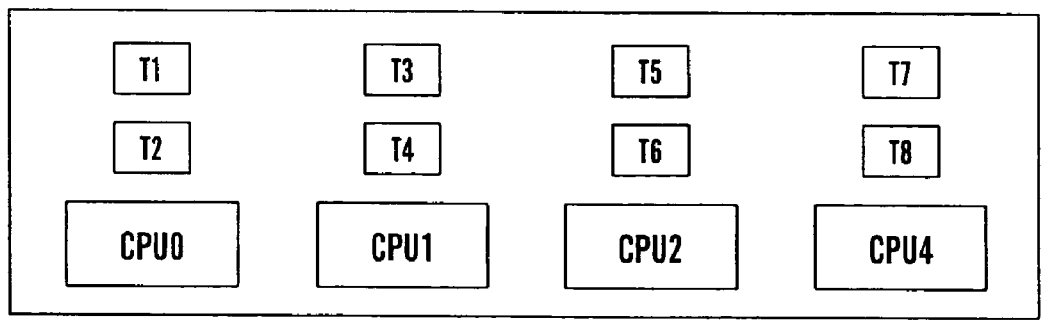

FIGS. 5-6 illustrate replacement of a CPU from a computer system comprising multiple CPUs, in accordance with embodiments of the present invention. In FIG. 5, the multiple CPUs comprise CPU0, CPU1, CPU2, and CPU3 and CPU3 is to be replaced by CPU4. CPU0 has assigned tasks T1-T2, CPU1 has assigned tasks T3-T4, CPU2 has assigned tasks T5-T6, and CPU3 has assigned tasks T7-T8. The present invention discloses how to replace CPU3 by CPU4 while CPU0-CPU2 remain hot. FIG. 6 shows FIG. 5 after CPU3 has been replaced by CPU4. Replacing CPU3 comprises removing CPU3, which may include powering down CPU3. In FIG. 6, tasks T7-T8 have been decoupled from CPU3 and reassigned to CPU4.

Figure 7:
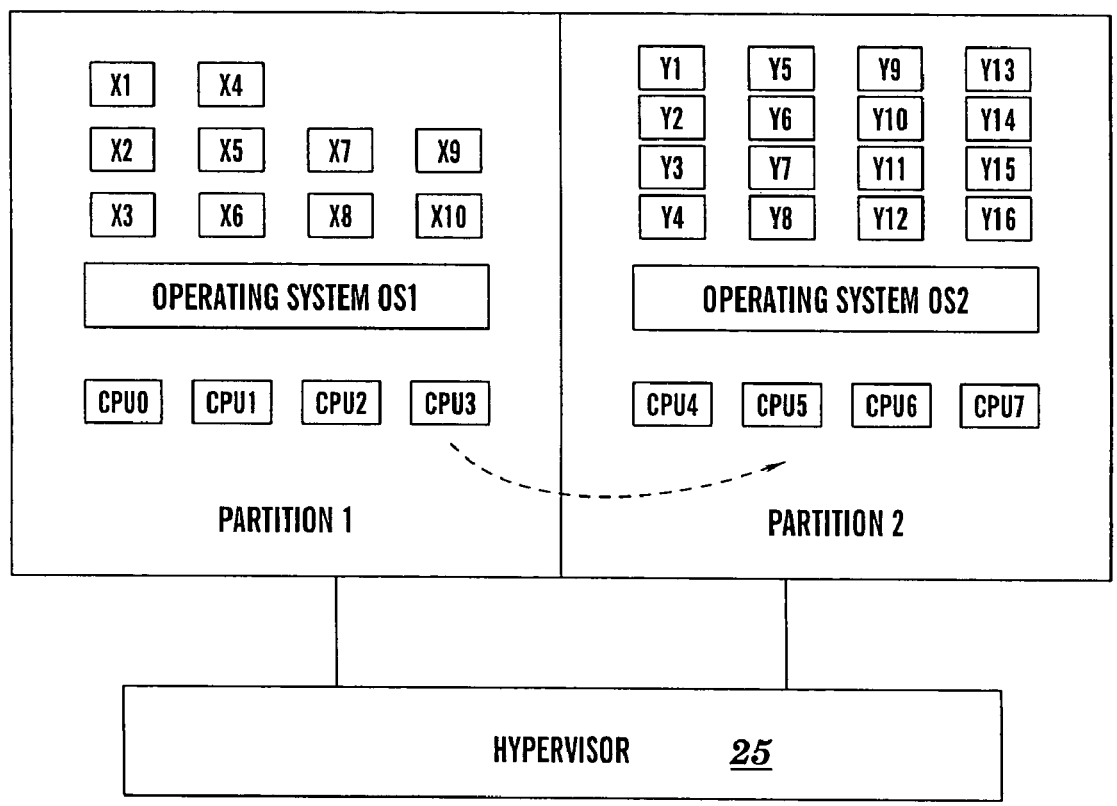
FIG. 7 illustrates moving a CPU from a first partition to a second partition of a computer system, in accordance with embodiments of the present invention.

FIG. 7 illustrates moving a CPU from a first partition (i.e., partition 1) to a second partition (i.e., partition 2) of a computer system, in accordance with embodiments of the present invention. The two partitions 1 and 2 function as independent computer systems within an overall computer system. Thus each partition has its own operating system and CPUs. The hypervisor 25 manages allocation of resources between partitions, mediates data movement between the partitions, controls data access between the partitions, and protect one partition's memory from corruption by errors in other partitions. While FIG. 7 shows only two partitions, the hypervisor 25 may manage a plurality of partitions.

Partition 1 comprises operating system OS1, the CPUs of CPU0-CPU3, and tasks X1-X10. Tasks X1-X3 are assigned to CPU0, tasks X4-X6 are assigned to CPU1, tasks X7-X8 are assigned to CPU2, and tasks X9-X10 are assigned to CPU3. Partition 2 comprises operating system OS2, the CPUs of CPU4-CPU7, and tasks Y1-Y16. Tasks Y1-Y4 are assigned to CPU4, tasks Y5-Y8 are assigned to CPU5, tasks Y9-Y12 are assigned to CPU6, and tasks Y13-Y16 are assigned to CPU7. A motivation in moving CPU3 from partition 1 to partition 2 may be that partition 2 is more loaded with tasks than is partition 1, so that moving CPU3 from partition 1 to partition 2 effectuates load balancing.

The present invention discloses how to move CPU3 from partition 1 to partition 2 while CPU0-CPU2 remain hot. First, CPU3 is decoupled from its tasks X9-X10 while CPU0-CPU2 remain hot. Next, the hypervisor 25 moves CPU3 from partition 1 to partition 2 while both partition 1 and partition 2 remain hot. Therefore, partition 1 and partition 2 need not be powered down while CPU3 is being moved from partition 1 to partition 2.

In addition to each CPU having tasks and runqueues associated as described supra, the CPUs can have various per-CPU resources attached to them. Some of these per-CPU resources may include, inter alia, interrupts and/or memory. Such per-CPU resources need to be decoupled from a CPU that is to be removed from a computer system or from a portion of a computer system.

Figure 8:
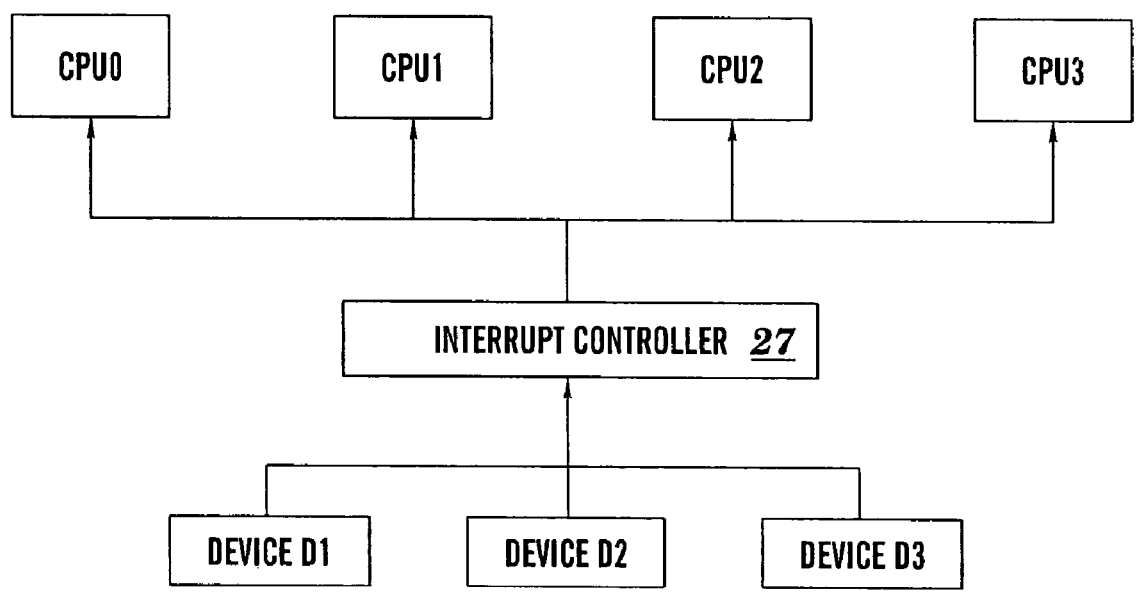
FIGS. 8-9 depict examples of decoupling a CPU from a per-CPU resource, in accordance with embodiments of the present invention.
Figure 9:
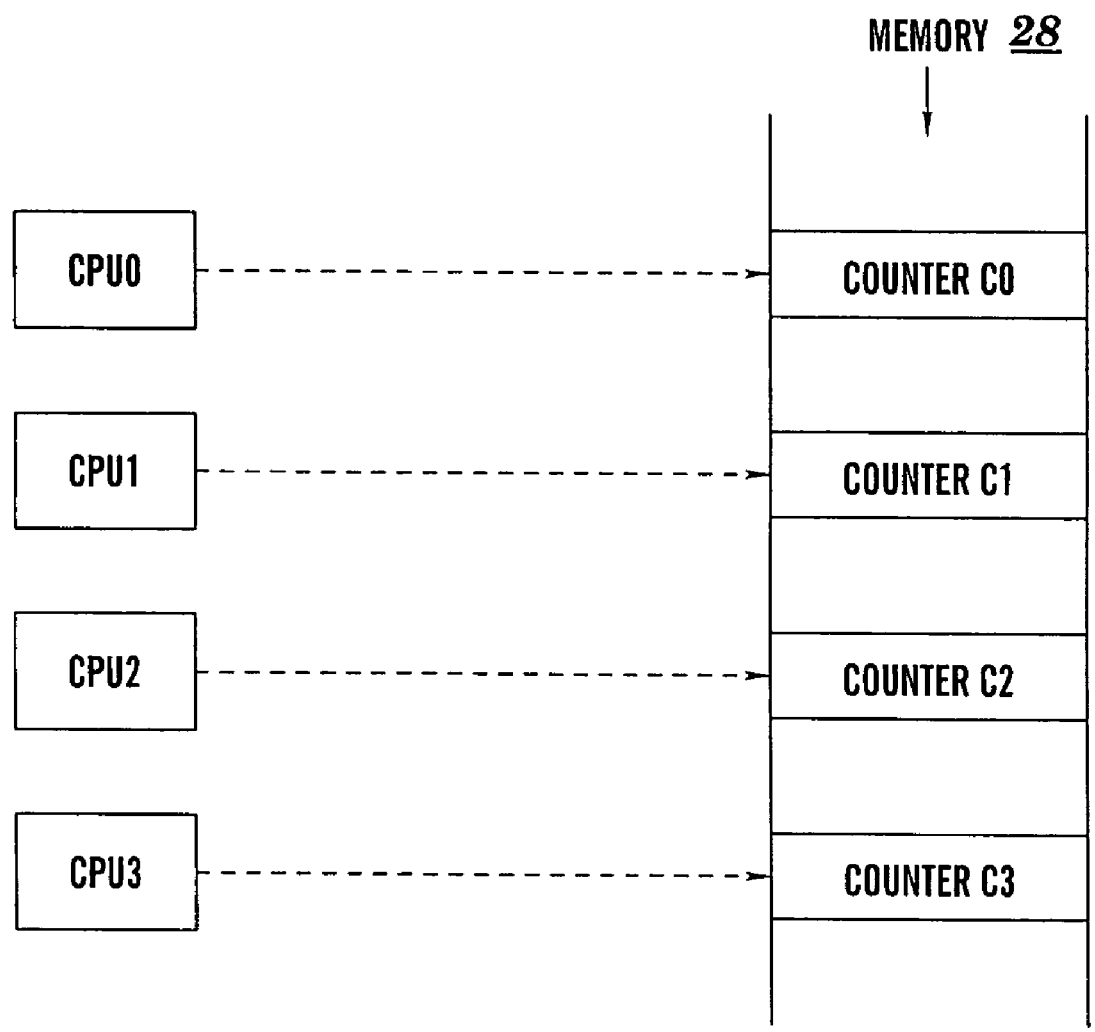

FIGS. 8-9 depict an example of decoupling a CPU from a per-CPU resource, in accordance with embodiments of the present invention. FIG. 8 shows an interrupt controller 27 interfacing between the devices D1-D3 and the CPUs CPU0-CPU3. Thus the interrupt controller 27 is adapted to distribute device interrupts among all 4 CPUs, namely CPU0, CPU1, CPU2, and CPU3. The interrupt controller 27 serves to balance the interrupt load on each CPU.

FIG. 9 shows how a counter in memory is split one per-CPU. In FIG. 9, memory 28 comprises counters C0-C3, and CPU0, CPU1, CPU2, and CPU3 is respectively associated with counters C0, C1, C2, and C3. The counters C0, C1, C2, and C3 keep track of how many interrupts (see FIG. 8 and discussion thereof supra) have been respectively processed on CPU0, CPU1, CPU2, and CPU3. If, instead of per-CPU counters, the counter were to be common for all CPUs, then each CPU would have to update the same counter at every interrupt. This would result in a "cache-line bouncing" effect, leading to performance degradation. To overcome this, FIG. 9 shows a separate counter for each CPU to write to it at every interrupt. To keep track of the total count of interrupts processed in the system, the various per-CPU counters C0, C1, C2, and C3 are each summed up.

During a CPU hot-remove operation in which one of the CPUs (i.e., CPU0, CPU1, CPU2, or CPU3) is removed while the other CPUs remain hot, the per-CPU resources (e.g., counters C0-C3) need to be migrated to other CPUs. During CPU hot-add operation in which a CPU is added, per-CPU resources (e.g., counters C0, C1, . . . ) need to be created or added while unaffected CPUs remain hot.

Figure 10:
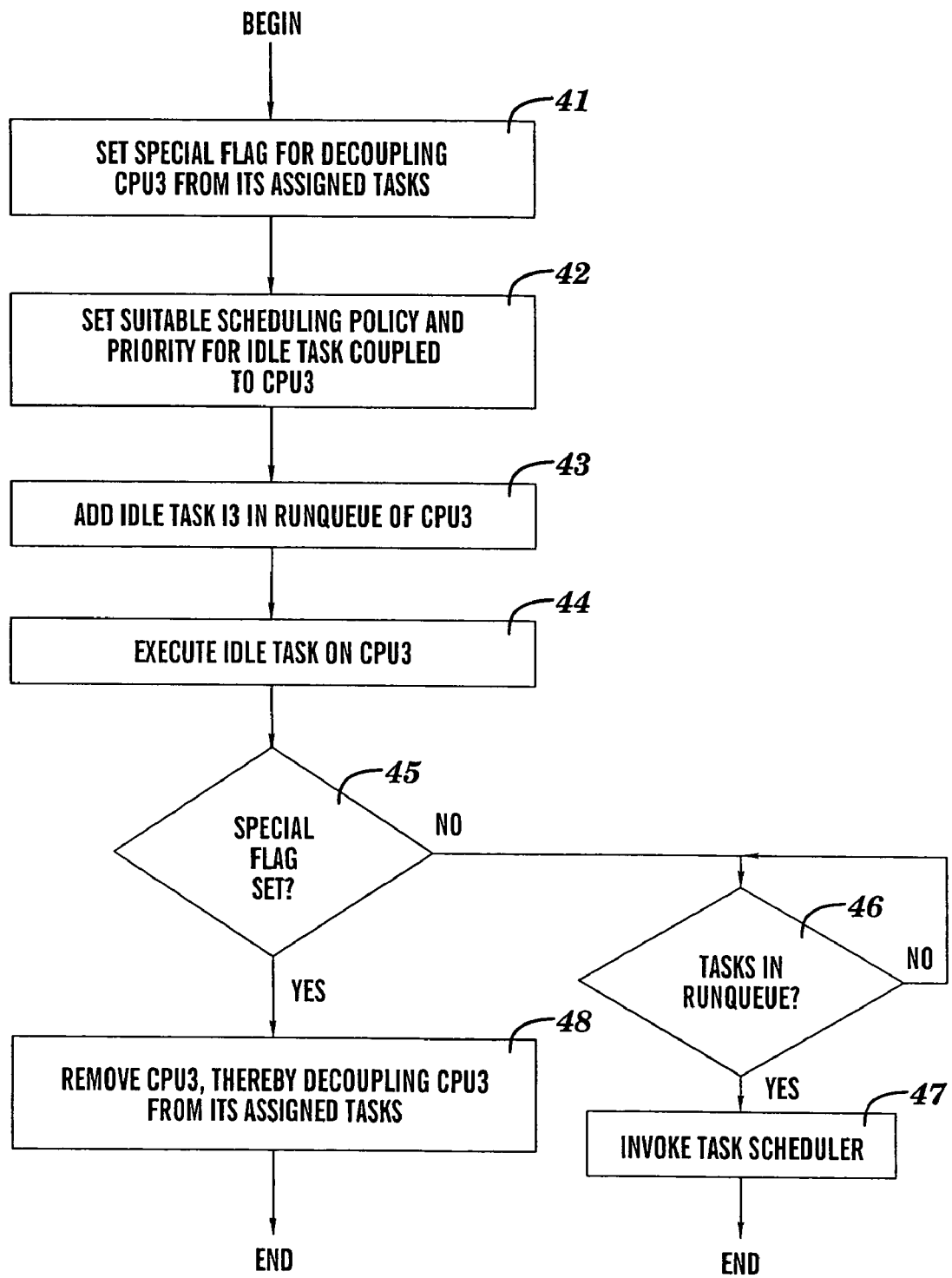
FIG. 10-11 are flow charts for describing a process that decouples a CPU from its assigned tasks, in accordance with embodiments of the present invention.
Figure 11:
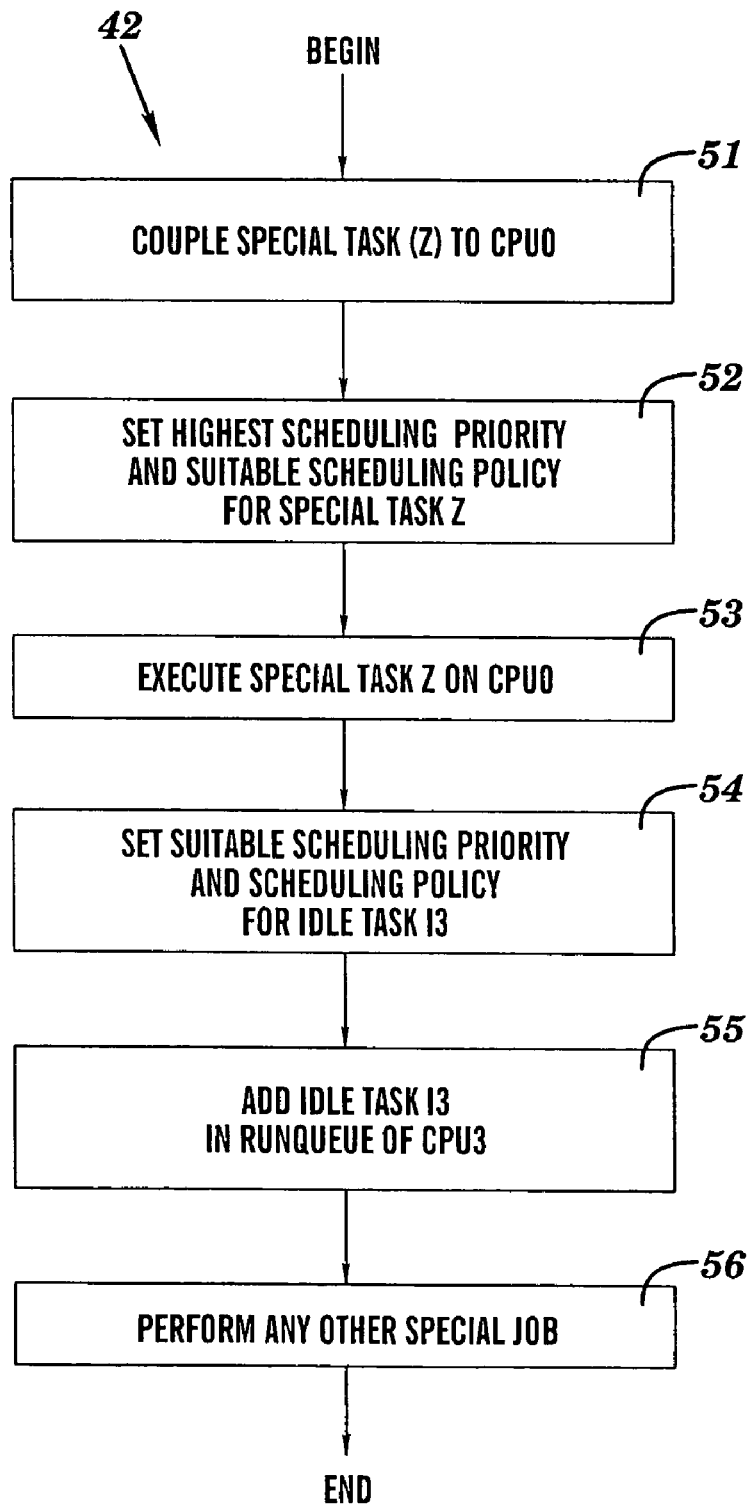

FIGS. 10-11 are flow charts for describing a process that decouples a CPU from its assigned tasks, in accordance with embodiments of the present invention. For illustrative purposes, the process of FIGS. 10-11 is applied to the case of decoupling CPU3 of FIG. 1 from its assigned tasks C, H-K, and Q-T. The method of FIGS. 10-11 is thus illustrated in terms of the computer system 30 of FIG. 1 and the operating system 20 of FIGS. 1 and 2.

FIG. 10 comprises steps 41-48. These steps may be executed as part of a system command or a system function invoked by the system administrator to remove a CPU (see FIG. 12). Step 41 sets a special flag denoting that CPU3 is to be decoupled from its assigned tasks. Step 41 may be performed by the operating system 20 such as by calling the special code 23 (see FIG. 2) to set the special flag. The special flag may be stored in a designated memory location within the computer system 30.

Step 42 sets a suitable scheduling policy and priority for the idle task I3 of CPU3. The suitable scheduling policy and priority chosen for idle task I3 is such that it gets continuous execution time to finish steps 45 and 48. If the scheduling policy chosen allocates time-slices for tasks, then the time-slice should be long enough so that the idle task can execute both steps 45 and 48 before the time-slice expires. Similarly, the scheduling priority chosen should be such that the idle task is not preempted by a higher priority task while the idle task is executing steps 45 and 48. The scheduling policy chosen may be SCHED_FIFO (or it's equivalent in non-POSIX® systems) and the scheduling priority chosen may be the highest possible in the system. SCHED_FIFO policy (or its equivalent) ensures that the idle task gets to execute continuously on the CPU as long as it wants and the highest scheduling priority chosen ensures that the idle task is not preempted by another task while it is executing on the CPU. Step 43 adds the idle task I3 in the runqueue 13 of CPU3, since an idle task is not present in any runqueue. The idle task may be added at the front of the runqueue, which ensures that the idle task, I3, gets to run as quickly as possible, ahead of anyone else in the runqueue. Thus idle task I3 can now becomes a highest prioritized task on runqueue 13 that preempts running task C, causing task C to be placed at the tail end of the runqueue 13 of CPU3 (see FIG. 1). In case task C is already running at the highest priority possible in the system, then the idle task I3 runs as soon as the task scheduler 21 (see FIG. 2) schedules it. Step 42 may be implemented as part of the system function to remove a CPU, the system function being invoked from any executing task or from the operating system 20 (see FIGS. 1 and 2). Alternatively, step 42 may be implemented as shown in steps 51-56 of FIG. 11. In one embodiment, the operating system 20 invokes the special code 23 (see FIG. 2) to execute, or facilitate execution of, steps 51-56.

Figure 13:
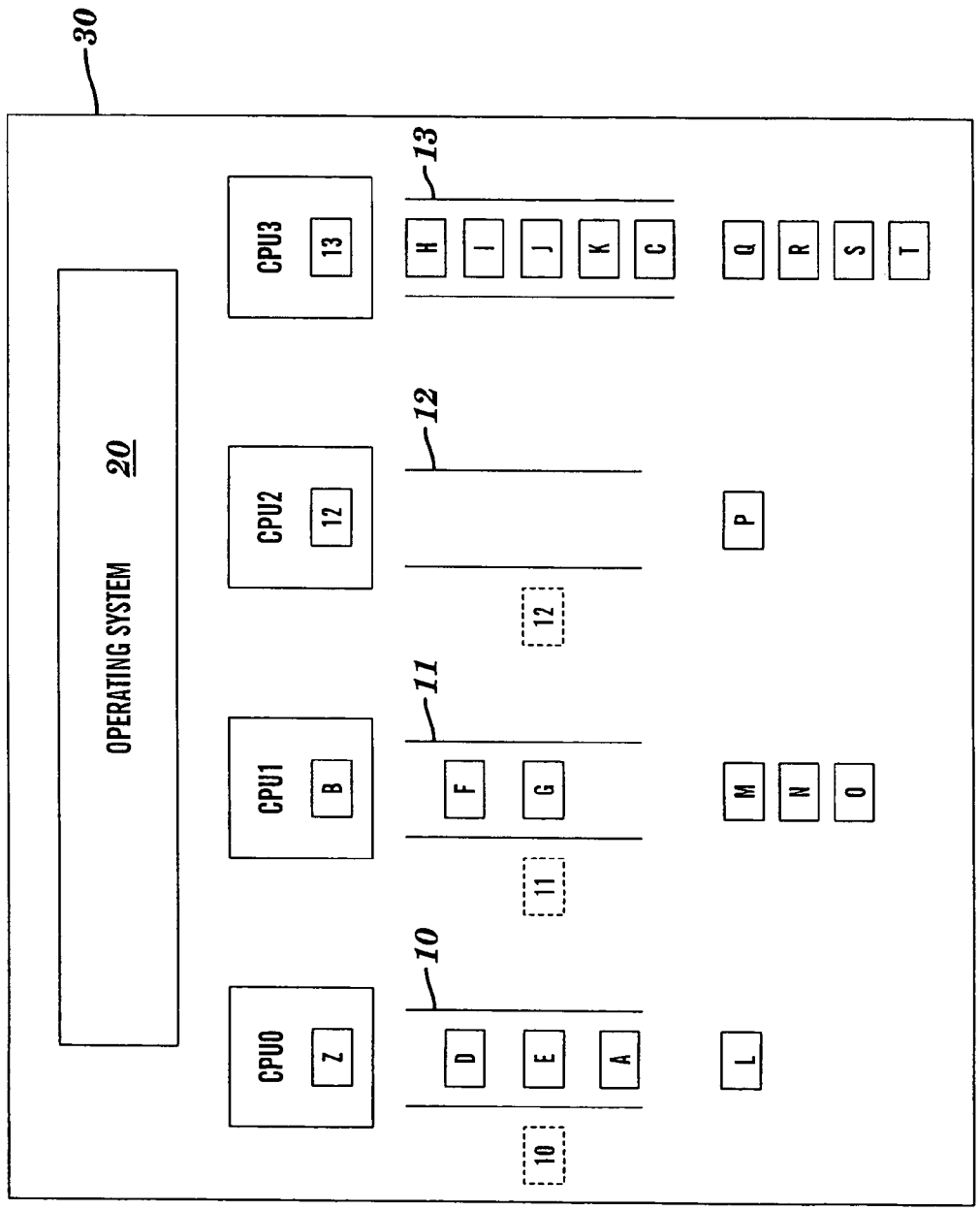
FIG. 13 depicts FIG. 1 with an idle task running on a first CPU and with a special task running on a second CPU, in accordance with embodiments of the present invention.

In FIG. 11, step 51 couples a special task Z to CPU0 (or any other CPU of the computer system 30). The special task Z may be created by the special code 23 (see FIG. 2) after the special code 23 is invoked (e.g., called) by the operating system 20. Alternatively, the special task Z may already exist when the special code 23 is invoked. Step 52 sets the highest scheduling priority and a suitable scheduling policy for the special task Z. The suitable scheduling policy chosen for task Z is such that it gets continuous execution time to finish steps 54-56. Thus, special task Z can preempt running task A (see FIG. 1), causing task A to be placed at the tail end of the runqueue 10 of CPU0. Alternately if task A is already running at the highest priority possible in the system or if there are other highest-priority tasks already queued up in the runqueue where special task Z is added, then the special task Z will have to wait for the operating system task scheduler 21 (see FIG. 2) to schedule it eventually on CPU0. Step 53 executes the special task Z on CPU0. No other task can preempt the special task Z while the special task Z is running on CPU0, since the special task Z is running at the highest priority possible in the system. Step 54 sets a suitable scheduling policy and priority for the idle task I3 of CPU3 as indicated in step 42 of FIG. 10. The suitable scheduling policy and priority chosen for I3 is such that I3 gets continuous execution time to finish steps 45 and 48 of FIG. 10. Step 55 adds the idle task I3 in the runqueue 13. In step 56, special task Z performs any other special job that may be required of it. FIG. 13 depicts FIG. 1 such that the special task Z is running on CPU0 by having preempted task A due to Z's highest scheduling priority and formerly-running task A has been placed at the tail end of the runqueue 10 of CPU0, in accordance with embodiments of the present invention.

Returning to FIG. 10, step 44 executes the idle task I3 on CPU3 due to the idle task I3 being added in the runqueue of CPU3 in step 43. FIG. 13 shows the idle task I3 running on CPU3 and formerly-running task C has been placed at the tail end of the runqueue 13 of CPU3.

The idle task I3 implements steps 45-48 of FIG. 10. Step 45 determines whether the special flag has been set. In other words, the idle task I3 needs to distinguish between the normal execution of idle task I3 as triggered by the runqueue 13 being empty and the special execution of idle task I3 as triggered by steps 42-43. Note that the scheduler code 21 (see FIG. 2) need not monitor the special flag.

If in step 45 the idle task I3 determines that the special flag has not been set, then step 46 determines whether any tasks are in the runqueue 13 of CPU3. If at least one task, other than the idle task itself, is in the runqueue 13, then the task scheduler 21 (see FIG. 2) is invoked to schedule execution of the tasks in the runqueue 13. If the runqueue 13 has no task therein, then the idle task I3 loops to wait until a task appears in the runqueue 13.

If in step 45 the idle task I3 determines that the special flag has been set then step 48 decouples CPU3 from its assigned tasks. The decoupling of CPU3 from its assigned tasks is accomplished by removing CPU3 for any purpose such as, inter alia: being removed without being replaced (see discussion supra relating to FIGS. 3-4); being removed in order to be replaced (see discussion supra relating to FIGS. 5-6); and being moved from a first partition to a second partition (see discussion supra relating to FIG. 7). As a special case, CPU3 is also considered to be removed if the idle task spins forever in a tight loop (with interrupts optionally disabled), without relinquishing control of CPU3. The steps involved in actually removing the CPU are platform specific. Once CPU3 is removed, CPU3 can no longer execute tasks that are in its runqueue. Thus those tasks in CPU3's runqueue have been decoupled from CPU3. The decoupling of CPU3 from its assigned tasks may occur while CPU0, CPU1, and CPU2 remain hot. Therefore, CPU0, CPU1, and CPU2 need not be powered down while CPU3 is being decoupled from its assigned tasks.

Figure 12:
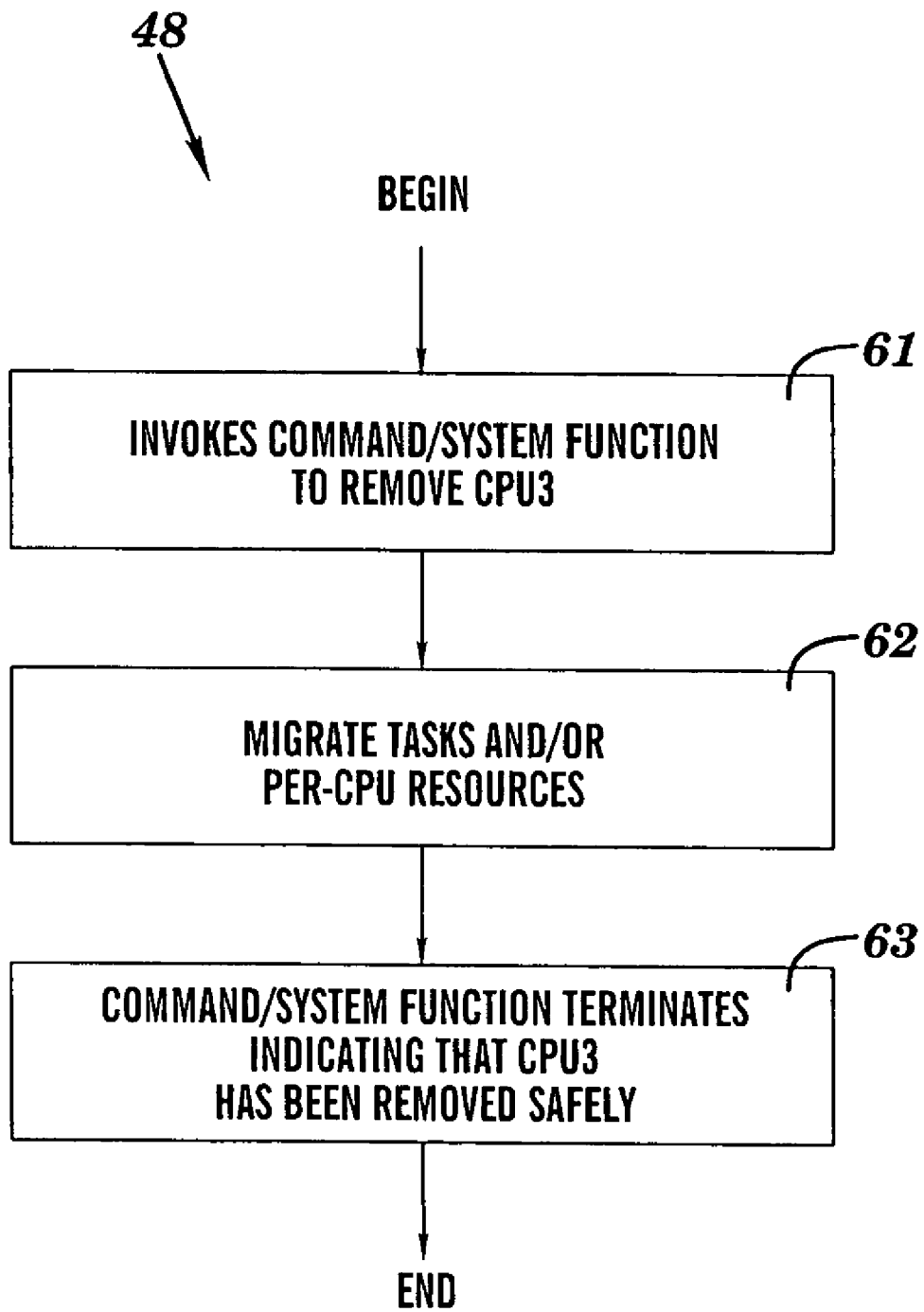
FIG. 12 is a flow chart describing removal of a CPU, in accordance with embodiments of the present invention.

FIG. 12 is a flow chart having steps 61-63 which describe the removal of CPU3, in accordance with embodiments of the present invention.

Step 61 invokes command/system function to remove CPU3. The command/system function performs steps 62-63.

Step 62 migrates tasks and/or per-CPU resources (see FIGS. 8-9 and description thereof described supra) that are assigned to CPU3. Note that the tasks which are assigned to CPU3 have been decoupled from being executed on CPU3 by step 48 of FIG. 10. The task migration of step 62 results in the tasks no longer being assigned to CPU3. The command/system function may sleep until tasks and/or per-CPU resource migration is complete. In one embodiment of this invention, step 62 may additionally restore the scheduling policy and priority of the idle task I3 to their default values, as well as take I3 off the runqueue 13. This will cause I3 to become again a lowest priority task that is not present in the runqueue.

Step 63 terminates the command/system function, indicating that CPU3 has been safely removed. Once CPU3 has been removed, the task scheduler 21 of the operating system 20 (see FIG. 2) will no longer assign any tasks and interrupts to CPU3. In other words, the number of CPUs that can execute tasks and process interrupts/exceptions has been reduced by one.

The steps in each of FIGS. 10-12 may be performed in any sequential order that is logically possible for decoupling a CPU from its assigned tasks and removing the CPU.

Figure 14:
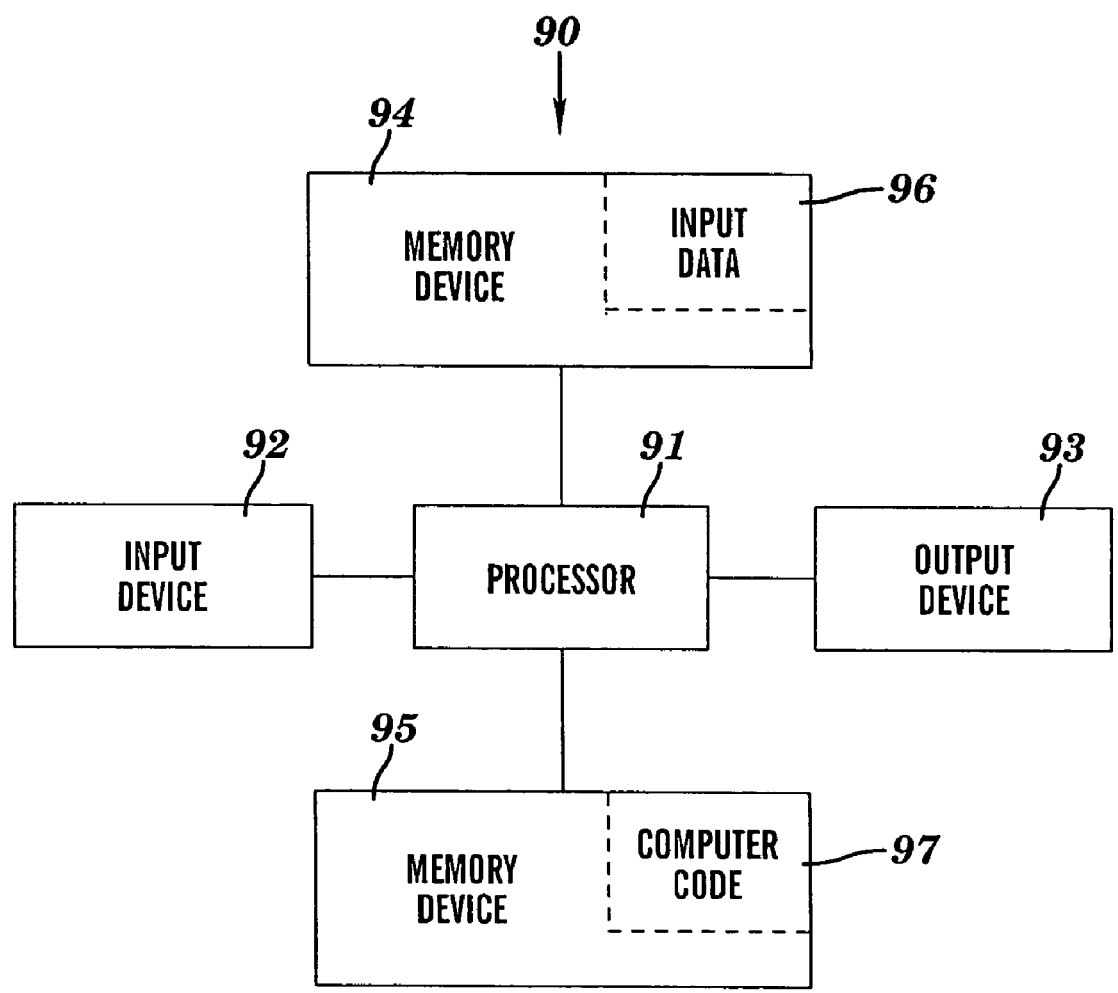
FIG. 14 illustrates a computer system used for decoupling a CPU from its assigned tasks and removing the CPU, in accordance with embodiments of the present invention.

FIG. 14 illustrates a computer system 90 used for decoupling a CPU from its assigned tasks and removing the CPU, in accordance with embodiments of the present invention. The computer system 90 comprises a processor 91, an input device 92 coupled to the processor 91, an output device 93 coupled to the processor 91, and memory devices 94 and 95 each coupled to the processor 91. For example, the processor 91 may represent any CPU discussed supra (e.g., any of the CPUs shown in FIG. 1) or any other CPU. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for decoupling a CPU from its assigned tasks and removing the CPU. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 14) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying computing infrastructure, comprising integrating computer-readable code into the computer system 90, wherein the code in combination with the computer system 90 is capable of performing a method for decoupling a first central processing unit (CPU) from its assigned tasks and removing the CPU.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

The preceding description of the present invention describes the idle task taking over control of a CPU and decoupling it from it's assigned tasks. In another embodiment, it is possible to create a special task of suitable scheduling policy and priority and run this special task on the CPU. This special task can then decouple the CPU from its other tasks. This special task is created every time any CPU is to be decoupled from its assigned tasks and may have to perform some platform dependent steps (like powering down CPU, release CPU to other partition etc). The platform dependent steps involve calling a platform dependent function, which may not return execution control to the calling code. For example, if a function "poweroff( )" is called to power-down the CPU, then the "power_off( )" never returns control back to calling code, which makes it difficult for the special task to be terminated once its job is done. This would mean that the special task forever remains in the system, even though there is no further need for the special task.

However the same task-termination situation is not an issue for the idle task. One idle task is created per CPU at bootup time and continues to remain in the system until the system is shut down. Normally when a CPU is added to the system, the CPU starts executing at a "known" entry point in the context of its idle task. If the CPU that is removed is later replaced by a new CPU, then the new CPU can start executing in the context of the same idle task at the "known" entry point. Hence there is no need to terminate the idle task after removing a CPU.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for decoupling a first central processing unit (CPU) of a computer system from its assigned tasks, said method comprising the steps of:

setting a special flag denoting that a first CPU of a plurality of CPUs within the computer system is to be decoupled from its assigned tasks, each CPU of the plurality of CPUs being managed by an operating system of the computer system;

setting a suitable scheduling policy and priority for a first special task coupled to the first CPU, the suitable policy and priority so chosen that the first special task gets enough continuous execution time on the first CPU to perform its entire job on the first CPU, before another task is made to execute on the first CPU;

after said setting the special flag and said setting the suitable scheduling policy and priority, adding the first special task in a runqueue of the first CPU; and after said adding the first special task in the runqueue of the first CPU, executing the first special task on the first CPU, said executing the first special task including determining that the special flag has been set to denote that the first CPU is to be decoupled from its assigned tasks,
said executing the first special task further including decoupling the first CPU from its assigned tasks in response to said determining that the special flag has been set to denote that the first CPU is to be decoupled from its assigned tasks,
said decoupling accomplished by having the first special task not relinquish control of the first CPU such that the first CPU is unable to execute any of its assigned tasks while the first special task is executing on the first CPU,
said decoupling of tasks from the first CPU leaving at least one remaining CPU of the plurality of CPUs,
said decoupling of tasks from the first CPU occurring while the at least one remaining CPU is either running tasks or processing interrupts and exceptions.

2. The method of claim 1, wherein the first special task is an idle task coupled to the first CPU.

3. The method of claim 1, wherein the first special task is created specially for the purpose of decoupling first CPU from its assigned tasks.

4. The method of claim 1, wherein the step of setting a suitable scheduling policy and priority for the first special task comprises the steps of:
coupling a second special task to some CPU, said some CPU being any CPU of the plurality of CPUs, said second special task having the highest scheduling priority and suitable scheduling policy that results in the second special task becoming a highest prioritized task on the runqueue of said some CPU; and
executing the second special task on said some CPU, including setting a suitable scheduling policy and priority for the first special task coupled to first CPU.

5. The method of claim 1, wherein the step of setting the special flag is performed by the operating system.

6. The method of claim 1, wherein the step of setting a suitable scheduling policy and priority for the first special task comprises invoking a system command or system function with respect to the operating system.

7. The method of claim 1, said method further comprising: after said decoupling the first CPU from its assigned tasks, migrating to the at least one remaining CPU the tasks decoupled from the first CPU.

8. The method of claim 1, wherein the computer system further comprises a scheduler code for scheduling execution of tasks on the plurality of CPUs, and wherein the scheduler code is not adapted to monitor the special flag.

9. The method of claim 1, wherein after decoupling the first CPU from its assigned tasks, said method further comprising not assigning any additional tasks and interrupts to the first CPU.

10. The method of claim 9, wherein after decoupling the first CPU from its assigned tasks, said method further comprising powering down the first CPU.

11. The method of claim 10, said method further comprising after powering down the first CPU: adding a new CPU to the at least one remaining CPU to replace the first CPU such that the plurality of CPUs comprises the new CPU.

12. The method of claim 9, wherein the computer system further comprises a plurality of partitions and a hypervisor adapted to manage the plurality of partitions, wherein the plurality of partitions includes a first partition and a second partition, wherein the first partition comprises the plurality of CPUs, and wherein after decoupling the first CPU from its assigned tasks said method further comprises moving the first CPU from the first partition to the second partition.

13. The method of claim 12, wherein said moving the first CPU from the first partition to the second partition is performed without powering down the first partition and without powering down the second partition.

14. The method of claim 9, wherein the computer system further comprises a per-CPU resource coupled to each CPU of the plurality of CPUs, and wherein said method further comprises:
disconnecting the per-CPU resource from the first CPU; and
after said disconnecting, migrating to the at least one remaining CPU the per-CPU resource disconnected from the first CPU.

15. A computer system comprising a processor and a computer readable memory unit coupled to the processor, said memory unit containing program code configured to be executed by the processor to implement a method for decoupling a central processing unit (CPU) from its assigned tasks, said method comprising the steps of:
setting a special flag denoting that first CPU of a plurality of CPUs within the computer system is to be decoupled from its assigned tasks, each CPU of the plurality of CPUs being managed by an operating system of the computer system;
setting a suitable scheduling policy and priority for a first special task coupled to the first CPU, the suitable policy and priority so chosen that the first special task gets enough continuous execution time on the first CPU to perform its entire job on the first CPU before another task is made to execute on the first CPU;
after said setting the special flag and said setting the suitable scheduling policy and priority, adding the first special task in a runqueue of the first CPU; and
after said adding the first special task in the runqueue of the first CPU, executing the first special task on the first CPU,
said executing the first special task including determining that the special flag has been set to denote that the first CPU is to be decoupled from its assigned tasks,
said executing the first special task further including decoupling the first CPU from its assigned tasks in response to said determining that the special flag has been set to denote that the first CPU is to be decoupled from its assigned tasks,
said decoupling accomplished by having the first special task not relinquish control of the first CPU such that the first CPU is unable to execute any of its assigned tasks while the first special task is executing on the first CPU,
said decoupling of tasks from the first CPU leaving at least one remaining CPU of the plurality of CPUs,
said decoupling of tasks from the first CPU occurring while the at least one remaining CPU is either running tasks or processing interrupts and exceptions.

16. The computer system of claim 15, wherein the first special task is an idle task coupled to the first CPU.

17. The computer system of claim 15, wherein the first special task is created specially for the purpose of decoupling first CPU from its assigned tasks.

18. The computer system of claim 15, wherein the step of setting a suitable scheduling policy and priority for the first special task comprises the steps of:
coupling a second special task to some CPU, said some CPU being any CPU of the plurality of CPUs, said second special task having the highest scheduling priority and suitable scheduling policy that results in the second special task becoming a highest prioritized task on the runqueue of said some CPU; and executing the second special task on said some CPU, including setting a suitable scheduling policy and priority for the first special task coupled to first CPU.

19. The computer system of claim 15, wherein the step of setting a suitable scheduling policy and priority for the first special task comprises invoking a system command or system function with respect to the operating system.

20. The computer system of claim 15, said method further comprising: after said decoupling the first CPU from its assigned tasks, migrating to the at least one remaining CPU the tasks decoupled from the first CPU.

21. The computer system of claim 15, wherein the computer system further comprises a scheduler code for scheduling execution of tasks on the plurality of CPUs, and wherein the scheduler code is not adapted to monitor the special flag.

22. The computer system of claim 15, wherein after decoupling the first CPU from its assigned tasks, said method further comprising powering down the first CPU.

23. The computer system of claim 22, said method further comprising after powering down the first CPU: adding a new CPU to the at least one remaining CPU to replace the first CPU such that the plurality of CPUs comprises the new CPU.

24. The computer system of claim 15, wherein the computer system further comprises a plurality of partitions and a hypervisor adapted to manage the plurality of partitions, wherein the plurality of partitions includes a first partition and a second partition, wherein the first partition comprises the plurality of CPUs, and wherein after decoupling the first CPU from its assigned tasks said method further comprises moving the first CPU from the first partition to the second partition.

25. The computer system of claim 24, wherein said for moving the first CPU from the first partition to the second partition is performed without powering down the first partition and without powering down the second partition.

26. The computer system of claim 15, wherein the computer system further comprises a per-CPU resource coupled to each CPU of the plurality of CPU, and wherein the method further comprises:

disconnecting the per-CPU resource from the first CPU; and after said disconnecting, migrating to the at least one remaining CPU the per CPU resource disconnected from the first CPU.

27. A computer program product, comprising a computer storage medium having a computer readable program code embodied therein, said computer readable program code comprising an algorithm adapted to be executed on a processor of a computer system to implement a method for decoupling a first central processing unit (CPU) from its assigned tasks, said method comprising the steps of:

setting a special flag denoting that the first CPU of a plurality of CPUs within the computer system is to be decoupled from its assigned tasks, each CPU of the of CPUs being managed by an operating system of the computer system;

setting a suitable scheduling policy and priority for a first special task coupled to the first CPU, the suitable policy and priority so chosen that the first special task gets enough continuous execution time on the first CPU to perform its entire job on the first CPU before another task is made to execute on the first CPU;

after said setting the special flag and said setting the suitable scheduling policy and priority, adding the first special task in a runqueue of the first CPU; and after said adding the first special task in the runqueue of the first CPU, executing the first special task on the first CPU, said executing the first special task including determining that the special flag has been set to denote that the first CPU is to be decoupled from its assigned tasks, said executing the first special task further including decoupling the first CPU from its assigned tasks in response to said determining that the special flag has been set to denote that the first CPU is to be decoupled from its assigned tasks, said decoupling accomplished by having the first special task not relinquish control of the first CPU such that the first CPU is unable to execute any of its assigned tasks while the first special task is executing on the first CPU, said decoupling of tasks from the first CPU leaving at least one remaining CPU of the plurality of CPUs, said decoupling of tasks from the first CPU occurring while the at least one remaining CPU is either running tasks or processing interrupts and exceptions.

28. The computer program product of claim 27, wherein the first special task is an idle task coupled to the first CPU.

29. The computer program product of claim 27, wherein the first special task is created specially for the purpose of decoupling first CPU from its assigned tasks.

30. The computer program product of claim 27, wherein the step of setting a suitable scheduling policy and priority for the first special task comprises the steps of:

coupling a second special task to some CPU, said some CPU being any CPU of the plurality of CPUs, said second special task having the highest scheduling priority and suitable scheduling policy that results in the second special task becoming a highest prioritized task on the runqueue of said some CPU; and executing the second special task on said some CPU, including setting a suitable scheduling policy and priority for the first special task coupled to first CPU.

31. The computer program product of claim 27, wherein the step of setting the special flag is performed by the operating system.

32. The computer program product of claim 27, wherein the step of setting a suitable scheduling policy and priority for the first special task comprises invoking a system command or system function with respect to the operating system.

33. The computer program product of claim 27, said method further comprising: after said decoupling the first CPU from its assigned tasks, migrating to the at least one remaining CPU the tasks decoupled from the first CPU.

34. The computer program product of claim 27, wherein the computer system further comprises a scheduler code for scheduling execution of tasks on the plurality of CPUs, and wherein the scheduler code is not adapted to monitor the special flag.

35. The computer program product of claim 27, wherein after decoupling the first CPU from its assigned tasks, said method further comprising not assigning any additional tasks and interrupts to the first CPU.

36. The computer program product of claim 35, wherein after decoupling the first CPU from its assigned tasks, said method further comprising powering down the first CPU.

37. The computer program product of claim 36, said method further comprising after powering down the first CPU: adding a new CPU to the at least one remaining CPU to replace the first CPU such that the plurality of CPUs comprises the new CPU.

38. The computer program product of claim 35, wherein the computer system further comprises a plurality of partitions and a hypervisor adapted to manage the plurality of partitions, wherein the plurality of partitions includes a first partition and a second partition, wherein the first partition comprises the plurality of CPUs, and wherein after decoupling the first CPU from its assigned tasks said method further comprises moving the first CPU from the first partition to the second partition.

39. The computer program product of claim 38, wherein said moving the first CPU from the first partition to the second partition is performed without powering down the first partition and without powering down the second partition.

40. The computer program product of claim 35, wherein the computer system further comprises a per-CPU resource coupled to each CPU of the plurality of CPUs, and wherein said method further comprises:
 disconnecting the per-CPU resource from the first CPU; and
 after said disconnecting, migrating to the at least one remaining CPU the per-CPU resource disconnected from the first CPU.

41. A process for deploying computing infrastructure, comprising integrating computer-readable code into a computer system, wherein the code in combination with the computer system is capable of performing a method for decoupling a first central processing unit (CPU) from its assigned tasks, said method comprising the steps of:
 setting a special flag denoting that a first CPU of a plurality of CPUs within the computer system is to be decoupled from its assigned tasks, each CPU of the plurality of CPUs being managed by an operating system of the computer system;
 setting a suitable scheduling policy and priority for a first special task coupled to the first CPU, the suitable policy and priority so chosen that the first special task gets enough continuous execution time on the first CPU to perform its entire job on the first CPU before another task is made to execute on the first CPU;
 after said setting the special flag and said setting the suitable scheduling policy and priority, adding the first special task in a runqueue of the first CPU; and
 after said adding the first special task in the runqueue of the first CPU, executing the first special task on the first CPU,
  said executing the first special task including determining that the special flag has been set to denote that the first CPU is to be decoupled from its assigned tasks,
  said executing the first special task further including decoupling the first CPU from its assigned tasks in response to said determining that the special flag has been set to denote that the first CPU is to be decoupled from its assigned tasks,
  said decoupling accomplished by having the first special task not relinquish control of the first CPU such that the first CPU is unable to execute any of its assigned tasks while the first special task is executing on the first CPU,
  said decoupling of tasks from the first CPU leaving at least one remaining CPU of the plurality of CPUs,
  said decoupling of tasks from the first CPU occurring while the at least one remaining CPU is either running tasks or processing interrupts and exceptions.

42. The method of claim 41, wherein the first special task is an idle task coupled to the first CPU.

43. The process of claim 41, wherein the first special task is created specially for the purpose of decoupling first CPU from its assigned tasks.

44. The process of claim 41, wherein the step of setting a suitable scheduling policy and priority for the first special task comprises the steps of:
 coupling a second special task to some CPU, said some CPU being any CPU of the plurality of CPUs, said second special task having the highest scheduling priority and suitable scheduling policy that results in the second special task becoming a highest prioritized task on the runqueue of said some CPU; and
 executing the second special task on said some CPU, including setting a suitable scheduling policy and priority for the first special task coupled to first CPU.

45. The process of claim 41, wherein the step of setting the special flag is performed by the operating system.

46. The process of claim 41, wherein the step of setting a suitable scheduling policy and priority for the first special task comprises invoking a system command or system function with respect to the operating system.

47. The process of claim 41, said method further comprising after said decoupling the first CPU from its assigned tasks, migrating to the at least one remaining CPU the tasks decoupled from the first CPU.

48. The process of claim 41, wherein the computer system further comprises a scheduler code for scheduling execution of tasks on the plurality of CPUs, and wherein the scheduler code is not adapted to monitor the special flag.

49. The process of claim 41, wherein after decoupling the first CPU from its assigned tasks, said method further comprising not assigning any additional tasks and interrupts to the first CPU.

50. The process of claim 49, wherein after decoupling the first CPU from its assigned tasks, said method further comprising powering down the first CPU.

51. The process of claim 50, said method further comprising after powering down the first CPU: adding a new CPU to the at least one remaining CPU to replace the first CPU such that the plurality of CPUs comprises the new CPU.

52. The process of claim 49, wherein the computer system further comprises a plurality of partitions and a hypervisor adapted to manage the plurality of partitions, wherein the plurality of partitions includes a first partition and a second partition, wherein the first partition comprises the plurality of CPUs, and wherein after decoupling the first CPU from its assigned tasks said method further comprises moving the first CPU from the first partition to the second partition.

53. The process of claim 52, wherein said moving the first CPU from the first partition to the second partition is performed without powering down the first partition and without powering down the second partition.

54. The process of claim 49, wherein the computer system further comprises a per-CPU resource coupled to each CPU of the plurality of CPUs, and wherein said method further comprises:
 disconnecting the per-CPU resource from the first CPU; and
 after said disconnecting, migrating to the at least one remaining CPU the per-CPU resource disconnected from the first CPU.

* * * * *